United States Patent [19]
Lafon

[11] Patent Number: 5,660,252
[45] Date of Patent: Aug. 26, 1997

[54] ROTATION RETARDER AND USE THEREOF

[75] Inventor: Thierry Lafon, Cergy, France

[73] Assignee: ITW de France, Beauchamp, France

[21] Appl. No.: 595,338

[22] Filed: Feb. 1, 1996

[30] Foreign Application Priority Data

Mar. 16, 1995 [FR] France .................. 95 03044

[51] Int. Cl.$^6$ ............................................. F16F 7/02
[52] U.S. Cl. .................. 188/130; 188/83; 188/381; 267/201
[58] Field of Search ......................... 188/130, 129, 188/381, 83, 82.84, 82.8, 82.1, 82.6, 268; 16/337–343, 354; 74/474, 531; 267/196–216

[56] References Cited

U.S. PATENT DOCUMENTS

| | | | |
|---|---|---|---|
| 2,819,060 | 1/1958 | Neidhart | 188/268 |
| 3,799,294 | 3/1974 | Symmons et al. | 188/67 |
| 3,846,138 | 11/1974 | Samiran et al. | 188/83 |
| 4,691,811 | 9/1987 | Arakawa et al. | 188/290 |
| 4,833,938 | 5/1989 | Reinwall et al. | 188/130 |
| 5,269,397 | 12/1993 | Kawamoto et al. | 188/290 |
| 5,276,945 | 1/1994 | Matsumura | 188/82.84 |
| 5,277,282 | 1/1994 | Umemura | 188/290 |
| 5,425,287 | 6/1995 | Beattie | 74/573 F |
| 5,440,248 | 10/1995 | Korb et al. | 188/130 |
| 5,460,252 | 10/1995 | Kosugi et al. | 188/296 |
| 5,542,508 | 8/1996 | Van Erden et al. | 188/290 |

FOREIGN PATENT DOCUMENTS

| | | | |
|---|---|---|---|
| 0392345 | 10/1990 | European Pat. Off. | |
| 2674588 | 10/1992 | France | |
| 2707716 | 1/1995 | France | |
| 4323095 | 10/1994 | Germany | |
| 1-266331 | 1/1990 | Japan | |
| 4337133 | 11/1992 | Japan | 188/83 |
| 552232 | 3/1993 | Japan | 188/83 |
| 6-2725 | 1/1994 | Japan | 188/83 |
| WO9313333 | 2/1993 | WIPO | |

*Primary Examiner*—Douglas C. Butler
*Attorney, Agent, or Firm*—Schwartz & Weinrieb

[57] ABSTRACT

A rotation retarder has a startor (1), a rotor (3) designed to receive the rotational movement to be retarded, and an elastic component (10) disposed between the rotor and the stator (2) the stator (2) having a seat (4) from which projects a shaft (6) with an overall cylindrical wall, and the rotor (3) having a housing (13) with an overall cylindrical wall for rotational mounting on the shaft (6). The retarder (1) is characterized in that the elastic component (10) is in direct contact with the wall of the shaft (6) and the wall of the housing (13) between which it is compressed, the area of contact between the first one of these walls and the elastic component (10) being larger than the area of contact between the second one of these walls and the elastic component (10), whereby the elastic component (10) is held on the first wall while the second wall is able to slide with respect to the elastic component (10).

23 Claims, 2 Drawing Sheets

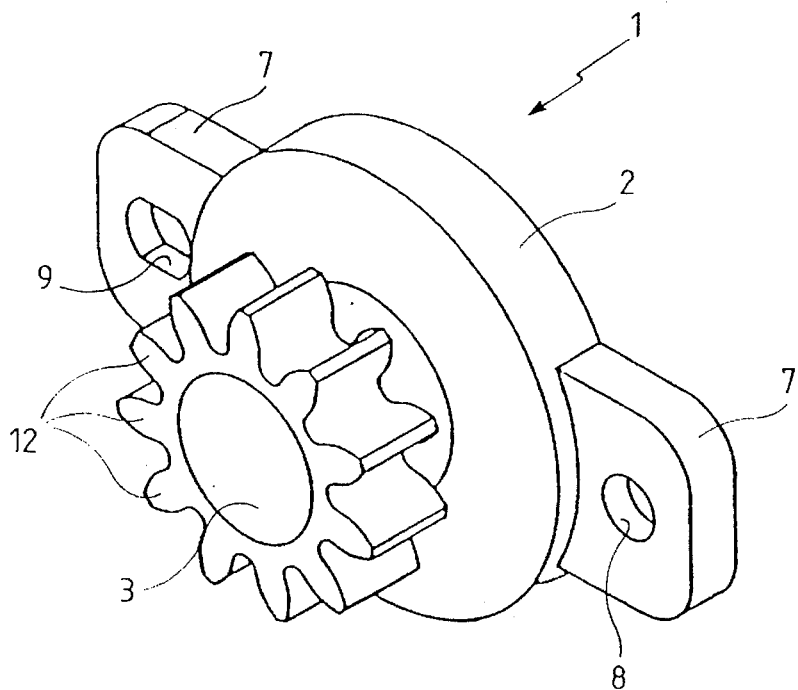
Fig.1
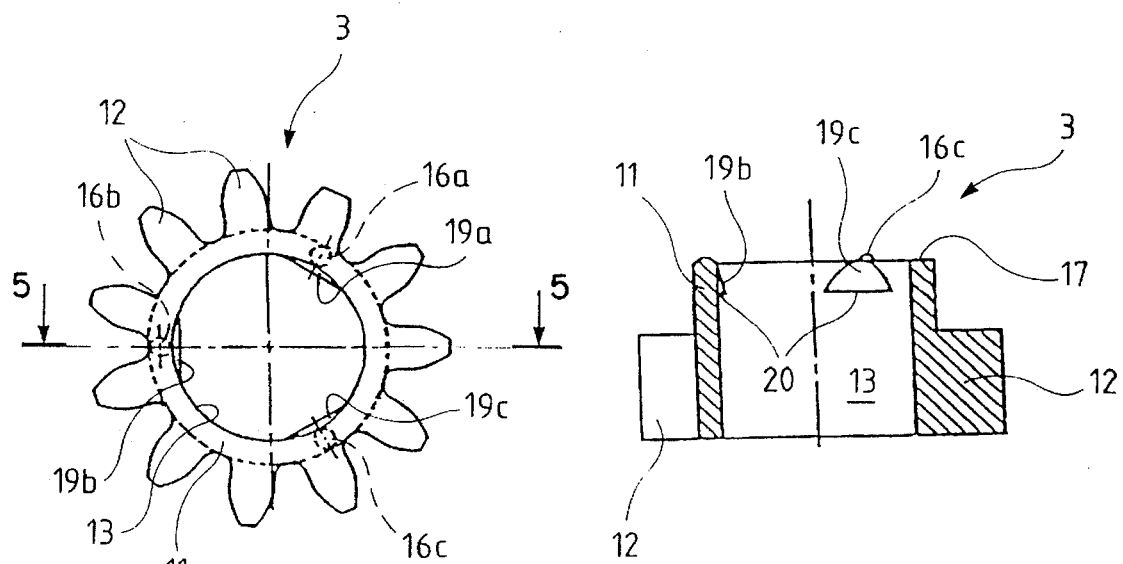
Fig.4
Fig.5

ROTATION RETARDER AND USE THEREOF

FIELD OF THE INVENTION

The present invention relates to a rotation retarder which includes a stator, and a rotor designed to receive the rotation movement to be retarded.

BACKGROUND OF THE INVENTION

Many components, mounted in motor vehicles, but not exclusively, such as handles, glove-box lids, ashtray lids or others, have their opening controlled for example by springs. The movement caused by the spring is generally abruptly arrested by a stop. This gives rise to more or less intense noises and more or less violent impacts between the corresponding component and the stop.

Through French patent application 92-03741 now French patent publication 2,674,588, a rotation retarder is known, by means of which the movements of the components caused by the spring are braked. This retarder includes a stator consisting of two cup-shaped pieces, one of which fits on top of the other in order to form a housing in which an O-ring made of elastic plastic is disposed against the peripheral wall. The O-ring member surrounds a circular component of smaller diameter forming part of the rotor, and balls are interposed between the ring and the circular component, which for this purpose has notches in its periphery. The rotational mounting of the rotor is effected by means of a small spindle which the stator has at the center of the housing, and which projects up-wardly with respect to the bottom thereof. The part of the rotor of which the circular component forms a part has at its center a bore engaged on this spindle, and this part also has, opposite this bore, a shaft which passes through the stator cover by means of a hole formed at the center of the cover, the rotor also having, outside the housing, a pinion fixed to this shaft in order to receive the rotational movement to be reached.

OBJECTS OF THE INVENTION

The invention aims to improve this type of retarder, notably with regard to the accuracy of the braking torque obtained. Its also aims to produce a rotational retarder which has a small number of parts and is easy to manufacture and to assemble, the retarder obtained thus providing to be inexpensive.

SUMMARY OF THE INVENTION

To this end it proposes a rotation retarder having a stator, a rotor designed to receive the rotational movement to be retarded, and an elastic means disposed between the rotor and the stator, the stator having a seat from which projects a shaft with an overall cylindrical wall, the rotor having a housing with an overall cylindrical wall for rotational mounting on the shaft, the retarder being characterized in that the elastic means is in direct contact with the wall of the shaft and wall of the housing between which it is compressed, the area of contact between a first portion of these walls and the elastic means being larger than the area of contact between a second portion of these walls and the elastic means, whereby the elastic means is effectively held on the first wall while the second wall is able to slide with respect to the elastic means.

The retarder thus obtained offers a braking torque depending essentially on the characteristic of the elastic means and on the radial stress applied to the latter because it is compressed. Since such arrangements are easy to implement during manufacture, the retarder according to the invention offers torque values which can be determined accurately and which remain constant over time.

In addition, this manufacture proves relatively easy, because of the small number of parts to be produced and assembled, in particular where at least some parts are obtained by plastic molding.

According to characteristics which are preferred for their simplicity and ease of implementation:

the elastic means is an annular component housed in a recess delimited by the first wall portion, the annular component is in contact with a cylindrical surface of the second wall portion.

In order to prevent any decoupling of the rotor and stator, the retarder also has steps disposed on the circumference of the wall of the housing, adapted to come into abutment against said elastic annular component if an axially oriented translational movement tends to move the rotor away from the stator.

Advantage is taken here of the presence of the annular component to effect a translational connection which is particularly easy to produce and which has no effect on the braking torque.

The internal face of the steps is advantageously curved.

In order to prevent friction between the rotor and stator due to the rotational guidance of one with respect to the other being irregular, which would disturb the regularity of the braking torque procured, the rotor is advantageously provided with studs affording contact with the rotor, with a rounded top and distributed with regular angular spacing on the end of the rotor facing the, seat.

Advantageously also, the shaft of the stator has a body in which the recess is hollowed out while centering surfaces are disposed so as to project with respect to the body.

The annular component received in the recess, coming into abutment here against the centering surfaces if a translation movement tends to move the rotor away from stator, results in the translational connection mentioned above being improved.

In addition, the friction due to the mounting between the rotor and stator is further limited, which reduces to the maximum extent the effect of this type of friction on the braking torque.

According to another aspect, the present invention concerns the use of a retarder as disclosed above to retard the rotational movement of a first component, in engagement with the rotor, with respect to a second component to which the stator is fixed.

The rotational retardation of a component rotating with respect to another component thus proves particularly easy to achieve.

This aspect of the invention is also very interesting where the first component is a door mounted so as to rotate on the second component.

BRIEF DESCRIPTION OF THE DRAWINGS

The disclosure of the present invention will be continued with the description of a preferred embodiment, given below for illustration and non-limitatively, with reference to the accompanying drawings in which like reference characters designate like or corresponding parts throughout the several views and wherein:

FIG. 1 is a perspective view of a retarder according to the preferred embodiment of the invention;

FIG. 4 is a plan view of the rotor of the retarder; and

FIG. 5 is a view in cross section of the rotor of FIG. 4, taken along the cutting line 5—5 in this last figure.

DETAILED DESCRIPTION OF THE PREFERRED EMBODIMENT

The rotation retarder 1 shown in FIGS. 1 to 5 has a stator 2 and a rotor 3 designed to receive the rotational movement to be retarded.

Figure 2:
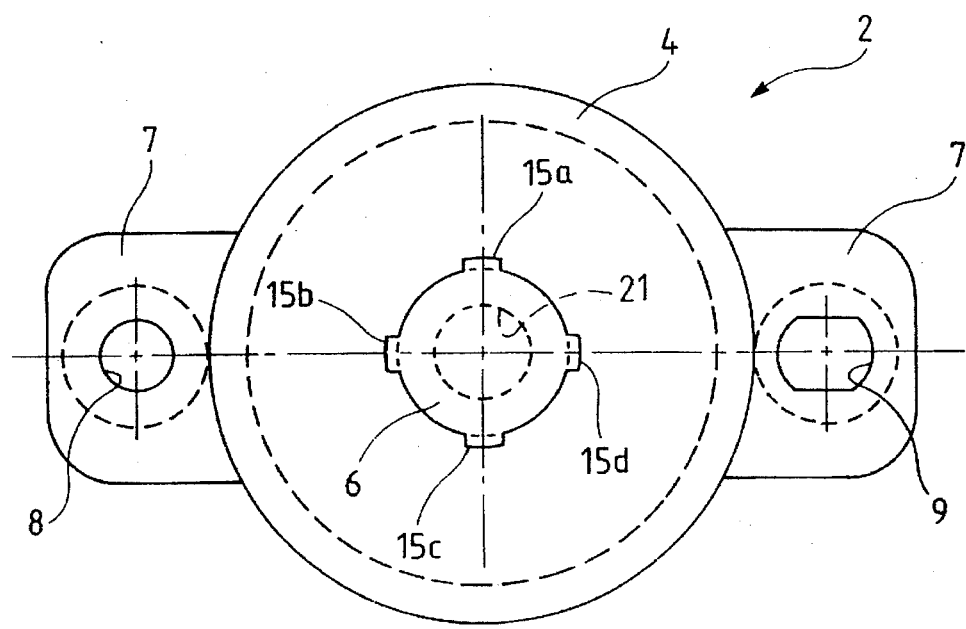
FIG. 2 is a plan view of the stator of this retarder.
Figure 3:
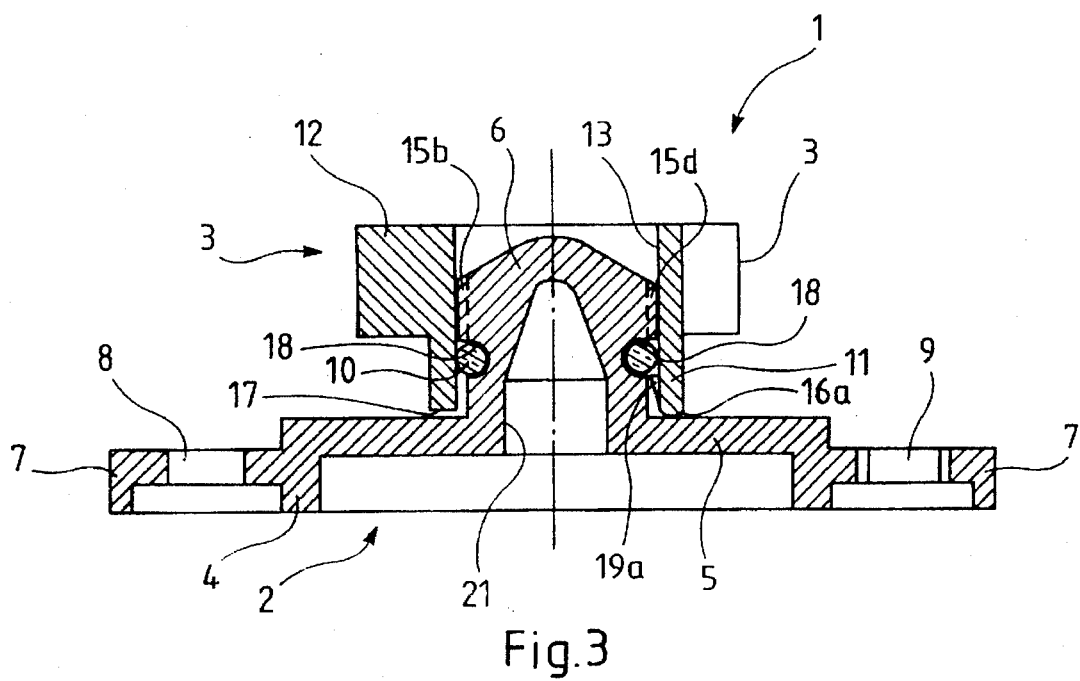
FIG. 3 is an elevation view in section along a plane of symmetry of this same retarder.

As can be seen particularly in FIG. 3, the stator 2 has a seat in the form of a cup 4, extended on the one hand, on the same side as the base 5 of the cup, by a shaft 6 with an overall cylindrical wall and on the other hand by two diametrically opposed lugs 7 for fixing the stator to a support, not shown. One of the lugs 7 has a circular fixing hole 8 and the other an oblong fixing hole 9 offering a certain amount of play in the positioning of the fixing means designed to pass through this hole 9.

The stator 2 and rotor 3 are each made of plastic molded in a single piece.

An elastic O-ring 10, here made of flexible plastic, is interposed and compressed radially between the stator 2 and rotor 3, in a manner which is detailed below.

The rotor 3 is formed from a section off a cylinder 11, open at both ends, and on the circumference of which, and over substantially half its length, teeth 12 forming a pinion are disposed.

This section of cylinder 11 forms a housing 13 with an overall cylindrical wall for the rotational mounting of the rotor 3 on the shaft 6 of the stator 2.

In this case, the shaft 6 has a body and at its end furthest away from the base 5 there are disposed, projecting with respect to the body, over substantially half of its length, four centering surfaces 15a–15d with regular angular spacing defined therebetween.

The housing section 13 of cylinder 11 is guided in rotation on these surfaces 15a–15d. Rotational guidance of this type naturally proves to be easier than on a continuous surface. In addition, such an arrangement makes it possible to reduce to the maximum extent the areas of contact between the rotor 3 and stator 2, limiting the friction due to such mounting, and designed to brake the rotor 3, solely through contact of this rotor 3 with the elastic O-ring 10.

For the same reasons of reduction of the areas of contact between the rotor 3 and stator 2, the housing section 13 cylinder 11 comes into contact with the base 5, solely by means of three contact studs 16a–16c distributed with regular angular spacing therebetween on the end 17 of the housing section 13 of cylinder 11, opposite the seat 4. The bottoms of these contact studs 16a–16c are, in this regard, rounded.

The elastic O-ring 10 is housed in an annular recess 18 having a shape complementary to the ring 10 and hollowed out in the shaft 6. The bottoms of the centering surfaces 15a–15d, facing the base 5, are also at the level of this annular recess 18, here delimited by the overall cylindrical wall of the shaft 6.

In the non-assembled state of the rotor 3 and stator 2, the elastic O-ring projects slightly with respect to the centring surfaces 15a–15d, so that, in the assembled state, it is compressed between the rotor 3 at the bottom of the annular recess 18, in direct contact with the overall cylindrical walls of the shaft 6 and housing 13. In this way, its area of contact with the overall cylindrical wall of the shaft 6 is larger than that with the overall cylindrical wall of the housing 13 of the rotor 3.

By virtue of these arrangements, the ring 10 is held, more or less firmly, against the overall cylindrical wall of the shaft 6, in the annular recess 18, while the overall cylindrical wall of the housing 13 of the rotor 3, and therefore the rotor 3, is able to slide with respect to the ring 10.

The rotational movement which the rotor 3 may be given is thus retarded. Depending on the flexibility of the elastic O-ring 10 and the gripping thereof between the rotor 3 and stator 2, the braking torque to be applied can be chosen very precisely.

A translational connection defined between and the rotor 3 the stator 2 is effected by means of steps 19a–19c disposed on the circumference of the overall cylindrical wall of the housing 13, close to the end 17 of the latter so as to face the base 5.

These steps 19a–19c are shaped on the one hand so that each to creates a shoulder 20 adapted to come into abutment against the elastic O-ring 10, so that the rotor 3 is immobilized with respect to translation on the stator 2. This is because an axially oriented traction force applied to the rotor 3, in order to attempt to withdraw it from the stator 2, will be arrested by the steps 19a–19c coming into abutment against the elastic O-ring 10, which for its part is retained by its annular recess 18 and possibly the centering surfaces 15a–15d. In this way any translational movement will then be stopped.

It will also be noted that any translational movement in a direction opposite to that which has just been mentioned is arrested by the contact studs 16a–16c coming into abutment against the base 5 of the cup-shaped seat 4.

Moreover, these steps 19a–19c have an internal face which is curved, in order to facilitate the engagement of the rotor 3 on the stator 2 in the course of assembly.

They too are sized so as not to rub on the stator 2.

It will also be noted that the shaft 6 has an internal hollow 21 opening out onto the inside of the cup 4 so as to obtain a stator 2 of substantially constant thickness, in order to minimize any differences in shrinkage which may occur during manufacture, and to save on material.

In order to assemble the rotation retarder 1, it suffices to insert the elastic O-ring 10 in its annular recess 18 in the stator 2, and then to engage the rotor 3 on the stator 2 by a simple pushing movement.

When the pinion formed by the teeth 12 receive a rotational movement from a component given such a movement, for example a glove-box lid whose opening is controlled by spring, the rotor 3 is driven with respect to the stator 2 to another component, for example the glove box itself, a resistive torque which brakes, damps or retards the rotational movement then being communicated to this rotor 3 by means of the elastic O-ring 10, Many variants are possible according to circumstances. Notably several elastic O-rings could be used, housed in several annular recesses, along the shaft 6, or again a plurality of elastic means, such as studs made from elastic material, each held in a retaining cavity formed either in the overall cylindrical wall of the shaft 6 or in that of the housing 13 can be used.

The retaining cavities can be formed in one of the walls, so that the elastic means occupy at least a plurality of zones angularly distributed around the shaft, in place of the elastic O-ring 10 housed in the annular recess 18.

The shape of the seat of the stator 2 can also be modified in order to adapt it to a given support.

It should be stated that the invention is not limited to the examples described and depicted. In light of the above teachings, it is therefore to be understood that within the scope of the appended claims, the present invention may be practiced otherwise than as specifically described herein.

I claim:

1. A rotation retarder, comprising:

a stator;

rotor means rotatably mounted upon said stator for undergoing rotational movement with respect to said stator and which rotational movement is to be retarded;

elastic means interposed between said rotor means and said stator so as to be compressed therebetween; and means mounting said elastic means upon one of said stator and rotor means such that said elastic means is disposed in direct contact with said one of said stator and rotor means over a first area of contact which is greater than a second area of direct contact defined between said elastic means and the other one of said stator and rotor means such that when said elastic means is mounted upon said stator, said elastic means is fixedly retained upon said stator while said rotor means is permitted to rotate relative to said elastic means and said stator whereby retarded rotation between said elastic means, fixedly retained upon said stator, and said rotor means is achieved in response to rotation of said rotor means with respect to said stator, whereas when said elastic means is mounted upon said rotor means, said elastic means is fixedly retained upon said rotor means so as to permit said motor means, and said elastic means fixedly retained upon said rotor means, to rotate relative to said stator whereby retarded rotation between said rotor means and said stator, as a result of said elastic mean is fixedly retained upon said rotor means and rotatably engaging said stator, is achieved in response to rotation of said rotor means, and said elastic means fixedly mounted thereon, with respect to said stator.

2. The rotation retarder as set forth in claim 1, wherein:

said stator comprises a base portion and a substantially cylindrical shaft portion, having a substantially cylindrical external peripheral wall portion, projecting upwardly from said base portion; and said rotor means comprises a substantially cylindrical tubular housing portion having a substantially cylindrical internal peripheral wall portion disposed about said substantially cylindrical external peripheral wall portion of said stator.

3. The rotation retarder as set forth in claim 2, wherein:

said rotor means further comprises a plurality of gear teeth integrally formed upon outer peripheral wall portions of said substantially cylindrical tubular housing portion so as to define pinion means for meshed engagement with a corresponding gear member of a component whose rotational movement is to be retarded.

4. The rotation retarder as set forth in claim 2, wherein:

said elastic means comprises an O-ring member; and said substantially cylindrical shaft portion of said stator has an annular recess defined within said substantially cylindrical external peripheral wall portion thereof for housing said O-ring member.

5. The rotation retarder as set forth in claim 4, wherein:

said substantially cylindrical shaft portion of said stator comprises a plurality of centering surfaces equiangularly spaced about said substantially cylindrical shaft portion of said stator and projecting radially outwardly from said substantially cylindrical external peripheral wall portion thereof for rotatably mounting said rotor means thereon with a minimum amount of friction.

6. The rotation retarder as set forth in claim 5, wherein:

said substantially cylindrical tubular housing portion of said rotor means comprises a plurality of stepped surfaces equiangularly spaced about said substantially cylindrical tubular housing portion of Said rotor means and projecting radially inwardly from said substantially cylindrical internal peripheral wall portion thereof for engaging said O-ring member mounted upon said substantially cylindrical shaft portion of said stator so as to prevent axially separation of said rotor means from said stator once said rotor means is operatively rotatably mounted upon said stator.

7. The rotation retarder as set forth in claim 6, wherein:

said centering surfaces of said shaft portion of said stator and said stepped surfaces of said housing portion of said rotor are disposed at axial positions located upon opposite sides of said annular recess defined within said shaft portion of said stator, and said O-ring member disposed therein, so as to limit relative axial movement between said stator and said rotor means.

8. The rotation retarder as set forth in claim 2, wherein:

said substantially cylindrical tubular housing portion of said rotor means has a plurality of studs equiangularly spaced about a lower end portion of said substantially cylindrical tubular housing portion of said rotor means for engaging said base portion of said stator so as to rotatably support said rotor means up on said base portion of said stator with a minimum amount of friction.

9. The rotation retarder as set forth in claim 1, wherein:

said stator and said rotor means each comprises a component molded from a suitable plastic material.

10. A rotation retarder, comprising:

a stator;

rotor means rotatably mounted upon said stator for undergoing rotational movement with respect to said stator and which rotational movement is to be retarded;

elastic means interposed between said stator and said rotor means so as to be compressed therebetween; and recess means defined within one of said stator and rotor means for mounting said elastic means upon one of said stator and rotor means such that said elastic means is disposed in direct contact with said one of said stator and rotor means, as a result of being disposed within said recess means of said one of said stator and rotor means, over a first area of contact which is greater than a second area of direct contact defined between said elastic means and the other one of said stator and rotor means such that when said elastic means is mounted upon said stator, said elastic means is mounted upon said stator, while said rotor means is permitted to rotate relative to said elastic means and said stator whereby retarded rotation between said elastic means, fixedly retained upon said stator, and said rotor means is achieved in response to rotation of said rotor means with respect to said stator, whereas when said elastic means is mounted upon said rotor means, said elastic means is fixedly retained upon said rotor means so as to permit said rotor means, and said elastic means fixedly retained upon said rotor means, to rotate relative to said stator whereby retarded rotation between said rotor means and said stator, as a result of said elastic means being fixedly retained upon said rotor means and rotatably engaging said stator, is achieved in response to rotation of said rotor means, and said elastic means fixedly mounted thereon, with respect to said stator.

11. The rotation retarder as set forth in claim 11, wherein:

said stator comprises a base portion and a substantially cylindrical shaft portion, having a substantially cylindrical external peripheral wall portion, projecting upwardly from said base portion; and said rotor means comprises a substantially cylindrical tubular housing portion having a substantially cylindrical internal peripheral wall portion disposed about said substantially cylindrical external peripheral wall portion of said stator.

12. The rotation retarder as set forth in claim 11, wherein:

said recess means comprises an annular recess defined within said substantially cylindrical external peripheral wall portion of said substantially cylindrical shaft portion of said stator; and said elastic means comprises an O-ring member disposed within said annular recess defined within said shaft portion of said stator.

13. The rotation retarder as set forth in claim 12, wherein:

said substantially cylindrical shaft portion of said stator comprises a plurality of centering surfaces equiangularly spaced about said substantially cylindrical shaft portion of said stator and projecting radially outwardly from said substantially cylindrical external peripheral wall portion thereof for rotatably mounting said rotor means thereon with a minimum amount of friction.

14. The rotation retarder as set forth in claim 13, wherein:

said substantially cylindrical tubular housing portion of said rotor means comprises a plurality of stepped surfaces equiangularly spaced about said substantially cylindrical tubular housing portion of said rotor means and projecting radially inwardly from said substantially cylindrical internal peripheral wall portion thereof for engaging said O-ring member mounted upon said substantially cylindrical shaft portion of said stator so as to prevent axial separation of said rotor means from said stator once said rotor means is operatively rotatably mounted upon said stator.

15. The rotation retarder as set forth in claim 14, wherein:

said centering surfaces of said shaft portion of said stator and said stepped surfaces of said housing portion of said rotor means are disposed at axial positions located upon opposite sides of said annular defined within said shaft portion of said stator, and said O-ring member disposed therein, so as to limit relative axial movement between said stator and said rotor means.

16. The rotation retarder as set forth in claim 11, wherein:

said rotor means further comprises a plurality of gear teeth integrally formed upon outer peripheral wall portions of said substantially cylindrical tubular housing portion so as to define pinion means for method for meshed engagement with a corresponding gear member of a component whose rotational movement is to be retarded.

17. The rotation retarder as set forth in claim 11, wherein:

said substantially cylindrical tubular housing portion of said rotor means has a plurality of studs equiangularly spaced about a lower end portion of said substantially cylindrical tubular housing portion of said rotor means for engaging said base portion of said stator so as to rotatably support said rotor means upon said base portion of said stator with a minimum amount of friction.

18. A rotation retarder for retarding rotational movement of a component undergoing rotational movement, comprising:

a stator;

rotor means rotatably mounted upon said stator for operative connection to a component undergoing rotational movement so as to retard said rotational movement of said component;

elastic means interposed between said stator and said rotor means so as to be compressed therebetween; and means mounting said elastic means upon one of said stator and rotor mean such that said elastic means is disposed in direct contact with said one of said stator and rotor means over a first area of contact which is greater than a second area of direct contact defined between said elastic means and the other one of said stator and rotor means such that when said elastic means is mounted upon said stator, said elastic means is fixedly retained upon said stator while said rotor means is permitted to rotate relative to said elastic means and said stator whereby retarded rotation between said elastic means, fixedly retained upon said stator, and said rotor means, and said component operatively connected thereto, is achieved in response to rotation of said rotor means with respect to said stat or as a result of said rotational movement of said component, whereas when said elastic means is mounted upon said rotor means, said elastic means is fixedly retained upon said rotor means so as to permit said rotor means, and said elastic means fixedly retained upon said rotor means, to rotate relative to said stator whereby retarded rotation between said rotor means, and said component operatively connected thereto, and said stator, as a result of said elastic means fixedly retained upon said rotor means and rotatably engaging said stator, is achieved in response to rotation of said rotor means, and said elastic means fixedly mounted thereon, with respect to said stator as a result of said rotational movement of said component.

19. The rotation retarder as set forth in claim 18, wherein:

said rotor means further comprises a plurality of gear teeth integrally formed upon outer peripheral wall portions thereof so as to define pinion means for meshed engagement with a corresponding gear member of said component whose rotational movement is to be retarded.

20. The rotation retarder as set forth in claim 18, wherein:

said component comprises one of an automotive vehicle handle, glove-box lid, and an ashtray lid.

21. A rotation retarder, comprising:

a stator comprising a base portion and a substantially cylindrical shaft portion, having a substantially cylindrical external peripheral wall portion, projecting upwardly from said base portion;

rotor means, comprising a substantially cylindrical tubular housing portion having a substantially cylindrical internal peripheral wall portion disposed about said substantially cylindrical upon said stator for undergoing rotational movement which is to be retarded; and elastic means interposed between said rotor means and said stator so as to be compressed therebetween, said elastic means being disposed in direct contact with a first one of said stator and rotor means over a first area of contact which is greater than a second area of direct contact defined between said elastic means and a second one of said stator and rotor means whereby said elastic means is retained upon said first one of said stator and rotor means while retarded rotation between said elastic means and said second one of said stator and rotor means is achieved in response to rotation of said rotor means with respect to said stator.

22. A rotation retarder, comprising:

a stator comprising a base portion and a substantially cylindrical shaft portion, having a substantially cylindrical external peripheral wall portion, projecting upwardly from said base portion;

rotor means, comprising a substantially cylindrical tubular housing portion having a substantially cylindrical internal peripheral wall portion disposed about said substantially cylindrical external peripheral wall portion of said stator, rotatably mounted upon said stator for undergoing rotational movement which is to be retarded;

recess means defined within one of said stator and rotor means; and elastic means disposed within said recess means of said one of said stator and rotor means so as to be interposed between said stator and said rotor means and be compressed therebetween;

said elastic means being disposed in direct contact with said one of said stator and rotor means, as a result of being disposed within said recess means of said one of said stator and rotor means, over a first area of contact which is greater than a second area of direct contact defined between said elastic means and the other one of said stator and rotor means whereby said elastic means is retained upon said one of said stator and rotor means while retarded rotation between said elastic means and said other one of said stator and rotor means is achieved in response to rotation of said rotor means with respect to said stator.

23. A rotation retarder foe retarding rotational movement of a component undergoing rotational movement, comprising:

a stator comprising a base portion and a substantially cylindrical shaft portion, having substantially cylindrical external peripheral wall portion, projecting upwardly from said base portion;

rotor means, comprising a substantially cylindrical tubular housing portion having a substantially cylindrical internal peripheral wall portion disposed about said substantially cylindrical external peripheral wall portion of said stator, rotatably mounted upon said stator for operative connection to a component undergoing rotational movement so as to retard said rotational movement of said component; and elastic means interposed between said stator and said rotor means so as to be compressed therebetween, said elastic means being disposed in direct contact with a first one of said stator and rotor means over a first area of contact which is greater than a second area of direct contact defined between said elastic means and a second one of said stator and rotor means whereby said elastic means is retained upon said first one of said stator and rotor means while retarded rotation between said elastic means and said second one of said stator and rotor means is achieved in response to rotation of said rotor means with respect to said stator as a result of said rotational movement of said components.

* * * * *